Sept. 16, 1941.　　　E. J. DUNHAM　　　2,256,315
LIFT TRUCK
Original Filed Aug. 8, 1936　　4 Sheets—Sheet 1

INVENTOR.
Elmer J. Dunham.
BY Walter E. Schirmer
ATTORNEY.

Sept. 16, 1941.  E. J. DUNHAM  2,256,315
LIFT TRUCK
Original Filed Aug. 8, 1936  4 Sheets—Sheet 3

INVENTOR.
Elmer J. Dunham.
BY Walter E. Schirmer
ATTORNEY.

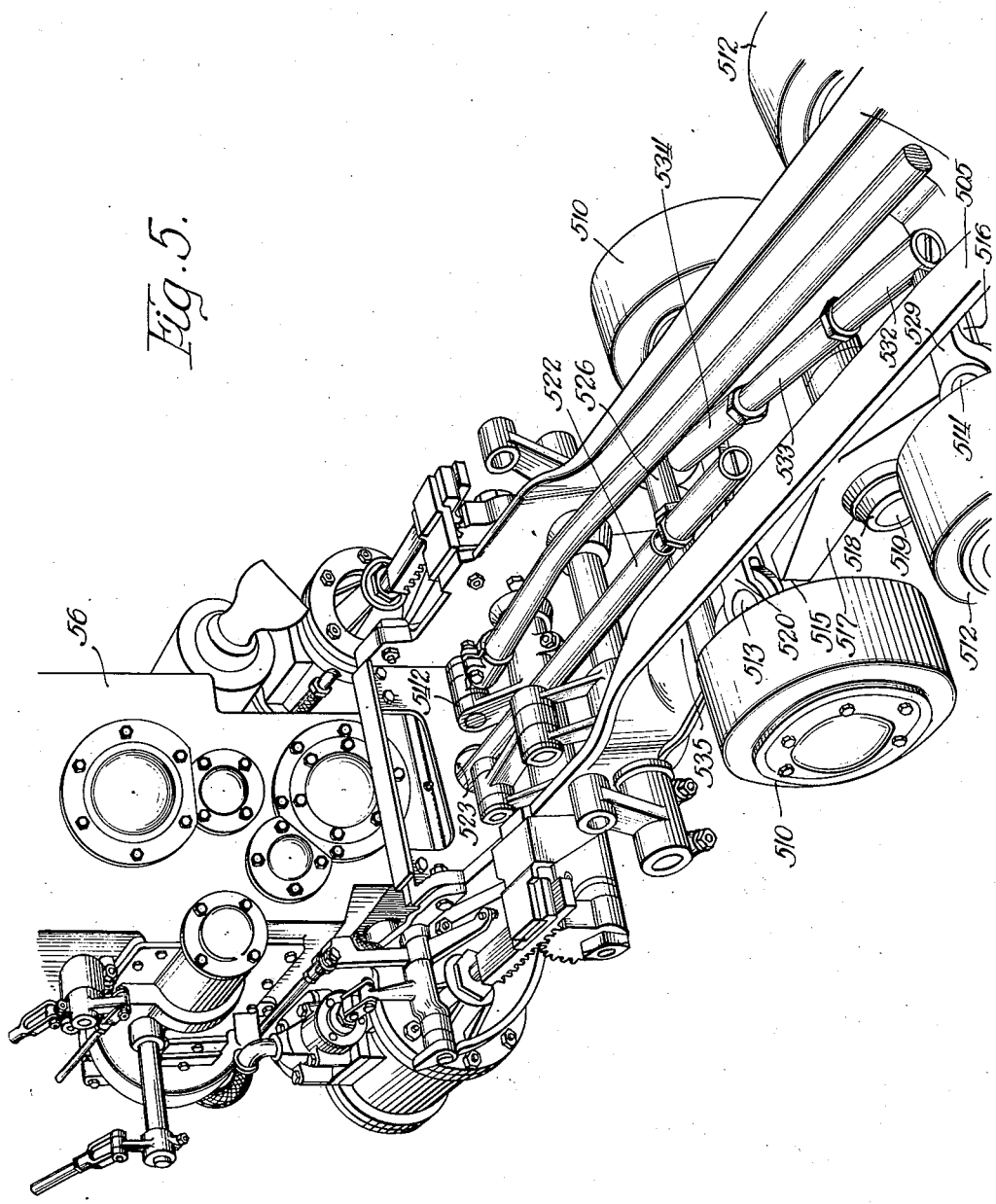

Patented Sept. 16, 1941

2,256,315

UNITED STATES PATENT OFFICE 2,256,315

LIFT TRUCK

Elmer J. Dunham, Battle Creek, Mich., assignor to Clark Equipment Company, Buchanan, Mich., a corporation of Michigan Original application August 8, 1936, Serial No. 94,926. Divided and this application August 23, 1939, Serial No. 291,527

5 Claims. (Cl. 280—91)

This invention relates to lift trucks, and more particularly is directed to improvements in the construction and operation of lift trucks of the type disclosed in United States Letters Patent, Nos. 1,707,428 and 1,986,134, issued April 2, 1929, and January 1, 1935, respectively, to Robert J. Burrows and to Burrows et al.

The present application is a division of my copending application, Serial No. 94,926, filed August 8, 1936, now Patent No. 2,197,926, issued April 23, 1940.

The invention is primarily concerned with self-propelled lift trucks, such as are now commonly used in warehouses, manufacturing plants, wharves and the like to lift and transport heavy loads of merchandise and stock about the premises. Trucks of this class are usually either of the electric motor propulsion type, deriving their energy from storage batteries or motor generator sets, or of the internal combustion engine propulsion type, similar in some respects to a tractor. In the instant case, the invention is directed to the internal combustion engine type of truck, and contemplates certain improvements and modifications in design and construction which facilitate easy and quiet operation of the truck under all conditions.

The present invention has for one of its primary objects a design of lift truck that will meet the demands of the industry for a heavy-duty low-lift truck with sufficient power to meet all ordinary operating conditions and with full load ramp characteristics on ramps of the type ordinarily encountered in the usual industrial plant.

One feature of the present invention is the novel design of steering mechanism employed when a six-wheel truck for heavy loads is provided. In such a construction, I provide a six-wheel machine in which all of the wheels are connected in such manner as to act as steering wheels when a turn is to be made. The front wheel suspension consists of four wheels which are so mounted as to impart great flexibility to the machine, and to relieve the frame of the machine from any severe strains when passing over uneven road surfaces. Each set of wheels is independent as the front and rear wheels of the four wheeled front truck on each side of the frame are mounted on a single rocker arm which is pivoted to the frame intermediate the wheels. Thus all four wheels remain in contact with the ground when the machine passes over uneven floors, which greatly assists in proper weight distribution, carrying capacity, and provides for substantially equalized tire wear.

Another feature of the present invention is the provision of a single steering mechanism which is so connected to the wheels as to effect simultaneous steering movement of all six wheels in the proper relative relation so as to effect turning of the vehicle without any lateral tire scuffing or the like.

The truck of the present invention includes a rear driving and steering axle in which the wheels are mounted for receiving driving torque from a central differential thru a universal joint arrangement which allows the wheels to be turned on vertical axes for steering movement. Proper geometric steering relationships are effected between the front sets of wheels and the rear driving wheels so that under all conditions, substantially equal pressure contact of the wheels with the ground is effected.

Still another feature of the present invention is the provision of a novel wheel mounting at the forward end of the truck whereby a single transverse shaft is employed having longitudinally directed rocker arms with wheels mounted at opposite ends thereof for rotation of the body about the transverse shaft. The wheels themselves are mounted on suitable spindles and cross connected transversely to provide co-ordinated steering movement.

Still another object of the present invention is the design of the truck, with particular attention to the accessibility of all of the parts thereof for servicing the same with the design being simplified so that the parts are capable of economical production.

Other features and advantages of the present truck construction will be more apparent from the following detailed description which, taken in conjunction with the accompanying drawings, will disclose to those skilled in the art, the particular construction and operation of a preferred form of the present invention.

In the drawings:

Figure 5 is a perspective view showing the arrangement of the steering wheels and their relationship to the frame construction.

Figure 1:
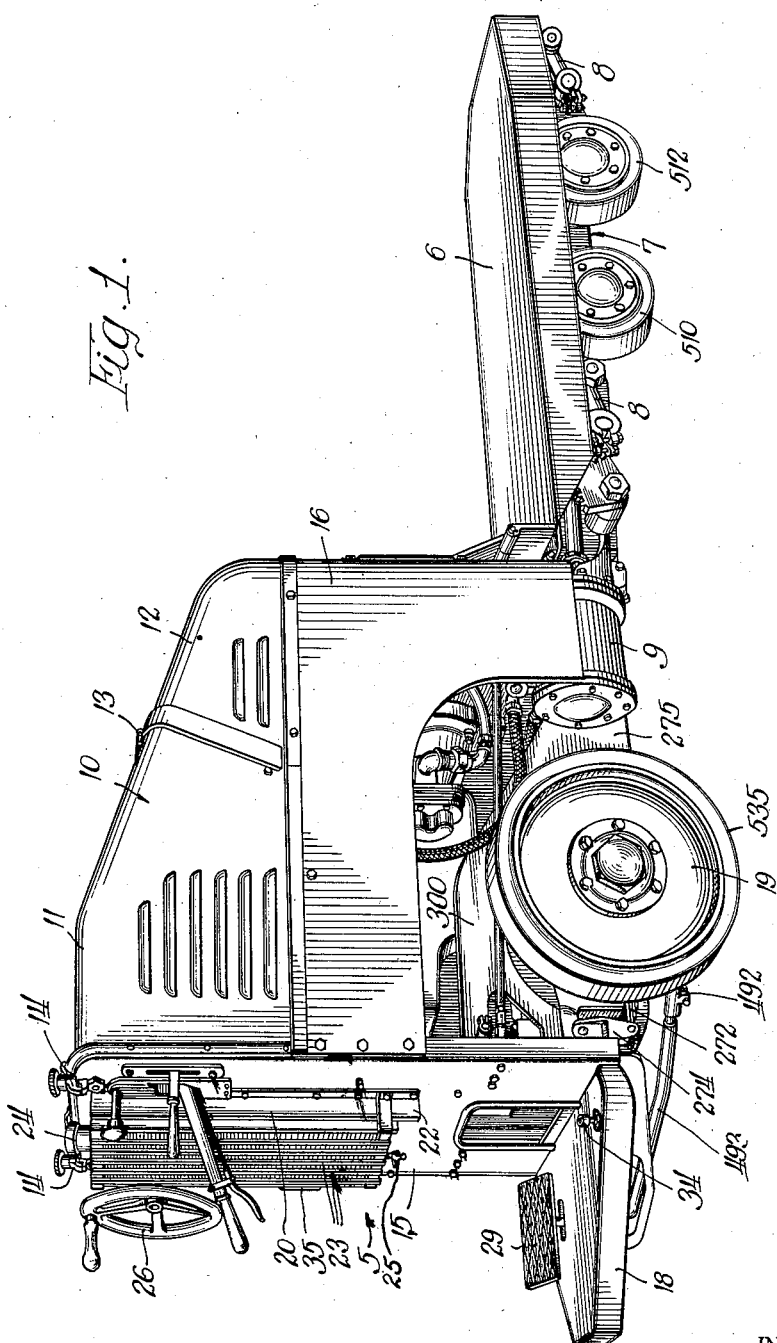
Figure 1 is a perspective view of the truck with the platform in lowered position.

Referring now in detail to the drawings, and more particularly to Figure 1, the lift truck is indicated generally by the numeral 5 and comprises a load platform 6 mounted over a front truck assembly indicated at 7, and adapted to be raised and lowered by rotation of the arms 8 connected to the under side of the platform and controlled by movement of the piston within the lift cylinder 9, as described in detail in the above-mentioned copending application.

The engine for the truck is mounted beneath the hood 10 which is formed in two sections 11 and 12, the section 11 being hinged at 13 so that it can be opened for inspection and servicing of the engine, and being held in closed position by the overhanging clamps 14 carried by the upright control panel 15 extending vertically at the forward end of the engine.

Suitable side plates 16 enclose the sides of the engine and the operating mechanism, and protect the same from mechanical injury. The operator's platform is indicated at 18 and is preferably rounded in order to eliminate any sharp corners, and so that the truck can readily be maneuvered in narrow aisles. Similarly, the forward end of the truck is tapered for maneuvering about sharp corners, and to prevent cornerwise abutment. The main drive wheels, resiliently tired, are indicated at 19, and are mounted beneath the engine forwardly of the operator's platform 18.

The control panel is provided with a suitable opening thru which extends the radiator 20 for the engine of the truck, the radiator being mounted in suitable supporting members 22 having protecting guard strips 23 over the outer face thereof. An inlet for the radiator is indicated at 24, and a suitable drain cock outlet is provided at 25, as is the customary practice.

The vehicle is steered by means of the hand wheel 26 mounted on a horizontal axis and adapted to be rotated by the operator standing on the platform 18. Through suitable gear means, such as the worm or sector gear mechanism conventionally used in automotive vehicles, rotation of the hand wheel effects corresponding rotation of a vertically extending shaft disposed forwardly of the panel 15 and controlling the operation of the steering mechanism, which will be described in more detail in connection with Figures 2 to 5.

The operator's platform 18 is preferably provided with a brake pedal 29 which is normally urged into brake setting position, and must be moved downwardly into a position flush with the platform in order to effect release of the band brake members described in my copending application. A suitable starter button 34 is also provided to eliminate hand cranking of the engine, and suitable instrument housings such as 35 are mounted below the steering wheel 26 and comprise an ammeter, an ignition switch, and any other suitable instruments, such as horn buttons, lighting switches, or the like.

Forwardly of the panel 15 and bolted to the upper end thereof adjacent the inner end of the post upon which the steering wheel 26 is mounted is the gear housing containing the reduction gearing for effecting rotation of the vertical shaft which controls the steering movement. This connection of the vertical shaft to the steering wheel is similar to the conventional steering arrangement at the lower end of an automotive steering post.

The rear axle of the vehicle is spring supported from the parallel extending side frame members 300 by means of leaf springs 272 journalled at one end in the shackles 274 and at the opposite end in similar shackles disposed at the dropped portion 275 of the side frame members. A transverse differential type axle is secured to the springs, and at its outer ends, has suitable spindle portions 267, as shown in Figures 3 and 4, by which the wheels 19 are spindle mounted for dirigible steering movement, while still being connected through suitable universal joint means as shown in my copending application for transmitting driving torque thereto.

Figure 3:
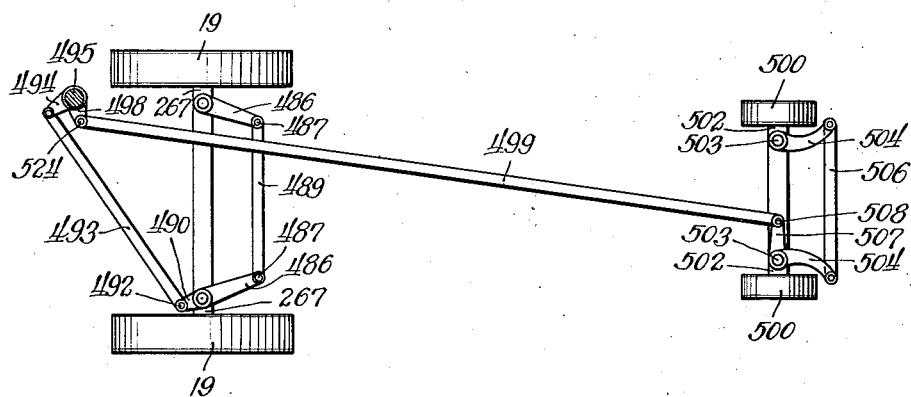
Figure 3 is a diagrammatic view showing the steering mechanism for a four-wheel truck.
Figure 4:
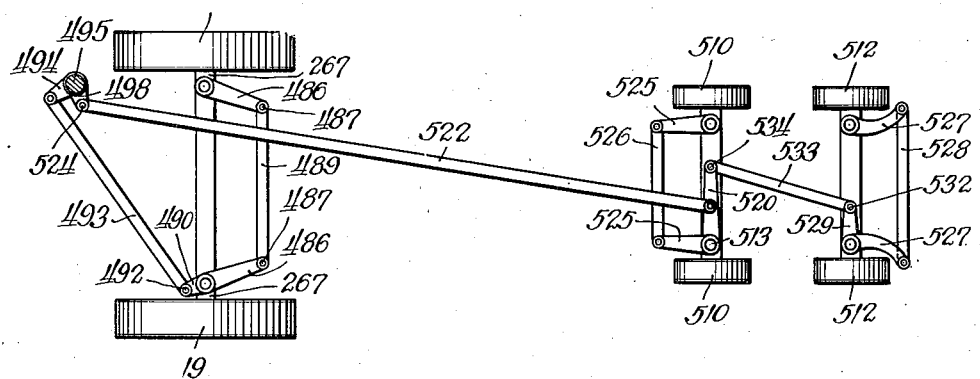
Figure 4 is a diagrammatic illustration of the steering linkage for a six-wheel truck.

Considering now the means employed for steering the vehicle, I have disclosed in Figures 3 and 4 two diagrammatic illustrations of steering linkage. I find that for loads up to approximately three tons, a four-wheel lift truck is desirable, while for greater load-carrying capacities, the number of wheels is preferably increased to six to retain as small diameter wheels as possible so that the platform 6 may be maintained at a low level.

Referring first to the four-wheel truck shown diagrammatically in Figure 3, the rear wheels 19 have driving connection with the rear axle spindles, and have their spindle mounting members 267 provided with flat vertically extending front faces to which are bolted crank arm 486, these crank arms being thereby rigidly secured for conjoint rotation with the spindles 267 and curving forwardly and inwardly to terminate in bearing portions 487 pivotally mounted between the opposite arms of yokes connected together by a tie rod 489. At the rear of the right hand wheel spindle 267, there is provided beneath frame member 300 a crank member 490 bolted to the spindle, and which at its end 492 is connected to the drag link 493 shown in Figure 1 extending under the operator's platform 18 and connected to a crank arm 494 carried at the lower end 495 of the vertically extending steering shaft, which at its upper end, is journalled in the bearing housing associated with the steering mechanism controlled by the steering wheel 26.

The steering shaft 495 is also provided with a second crank arm 498 which, at its free end, is connected to a forwardly extending drag link 499 disposed between the longitudinal side frame members 300 and extending toward the front wheels 500. Each of the wheels 500 is mounted on a spindle or steering knuckle 502 which provides a dirigible mounting therefor, and the spindle portions 503 thereof have the forwardly and outwardly extending arms 504 rigidly secured thereto to provide dirigible mounting of these wheels for swinging movement about their vertical axes. The wheels themselves are supported on the forward portion of the frame members, and the crank arms 504 are tied together for conjoint rotation about the pivots 503 by means of the tie rod 506. The right hand wheel 500 also has rigidly secured to its spindle bracket 502 the crank arm 507 which has pivotal connection at its outer end, indicated at 508, with the forward end of the substantially longitudinally extending drag link 499.

In the operation of this steering linkage, rotation of the hand wheel 26 results in corresponding rotation of the shaft 495, and the vehicle is turned to the left when the shaft 495 is rotated in a clockwise rotation. This results in corresponding rotation of the cranks 494 and 498. The crank 494 through the link 493 rotates the crank 490 to produce clockwise rotation of the crank arms 486, these two arms being tied together. The wheels 19 both simultaneously rotate in a clockwise direction, tending to move the rear end of the vehicle to the right. At the same time, however, the crank 498 through the tie rod 499 rotates the arm 507 in a counterclockwise direction to produce corresponding counterclockwise rotation of the crank arm 504 which, being tied together by the link or tie rod 506, produce corresponding rotation of the wheels 500, tending to rotate the front of the vehicle to the left. The opposite turning effect imparted to the front and rear wheels under such circumstances allows the vehicle to turn in a relatively short radius, which is distinctly advantageous when the truck is used in narrow aisles or passageways such as in warehouses, manufacturing plants, and the like.

Opposite rotation of the shaft 495 will impart an opposite turning effort to the wheels 19 and 500, causing the truck to make a right hand turn in the same manner. The drag links 493, 499, 489 and 506 are all preferably adjustable in length so that proper alinement of the wheels can be obtained and proper steering geometry can be maintained to prevent lateral side scuffing during turning movement.

Figure 2:
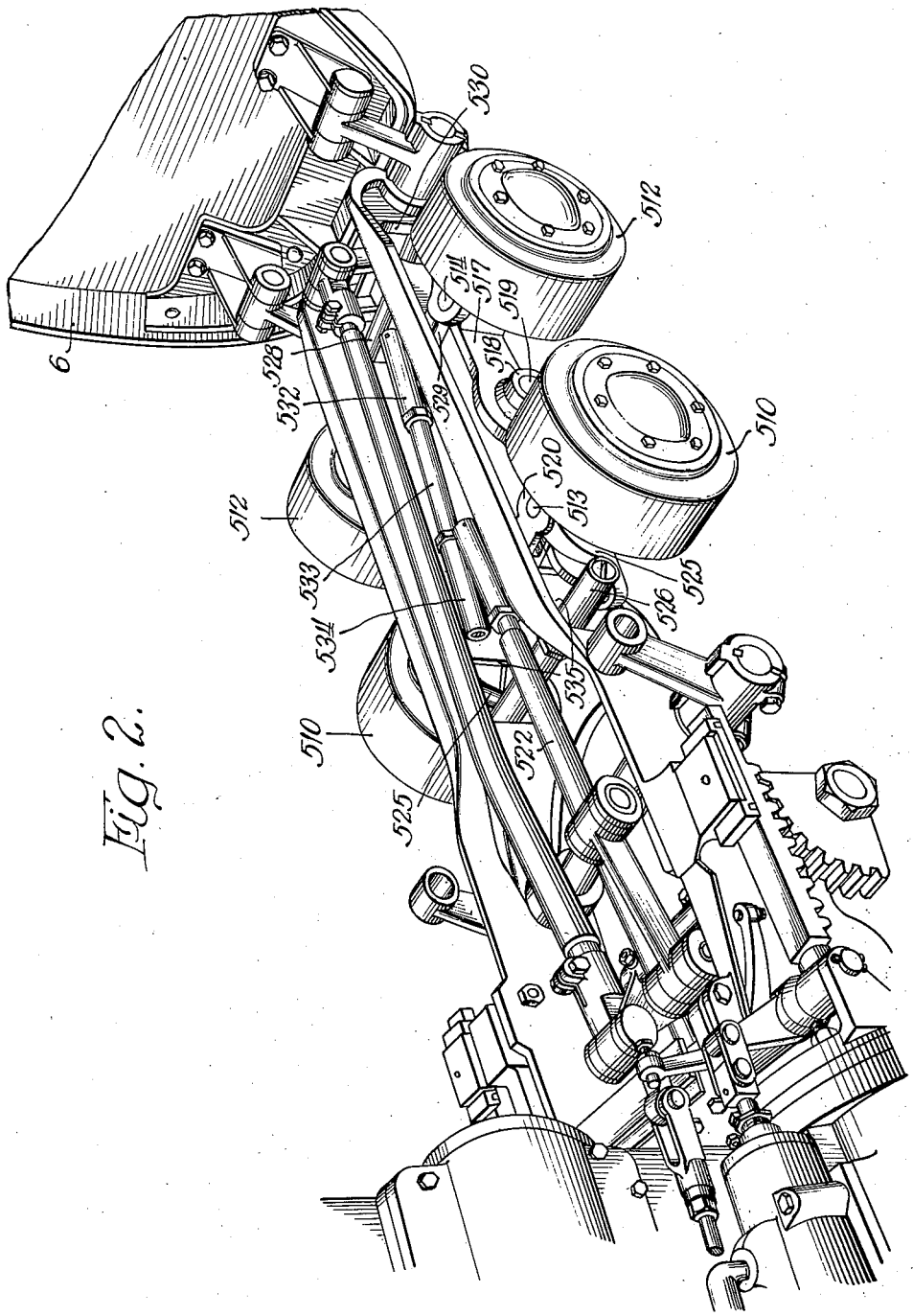
Figure 2 is a perspective view showing the front truck mounting for the steering wheels.

Considering now the six-wheel truck and the showing in Figures 2 and 5 of the detailed manner in which the four wheels comprising the front support of the truck are mounted, the respective pairs of wheels are indicated at 510 and 512. The wheels 510 and 512 on one side of the truck are each provided with spindle brackets 513 and 514, respectively, which are supported for vertical pivotal movement on the ends 515 and 516 of a horizontally extending arm 517. This arm at its center is provided with an enlarged boss portion 518 receiving the transversely extending shaft 519 which is journalled in suitable bearings in the forward ends 505 of the frame members 300, and which in turn supports the wheels 510 and 512 for dirigible movement about opposite ends thereof, and also for relative vertical movement, it being noted that if either the wheel 510 or 512 passes over an elevation in the floor, the entire arm 517 is rotated about its opposite end so that only one-half of the total vertical movement of either wheel is imparted to the cross shaft, and hence to the frame.

In a similar manner, the wheels 510 and 512 on the opposite side of the truck are supported by a corresponding arm 517 carried at that side and pivoted intermediate its ends on the transverse shaft 519. The spindle bracket 513 of the wheel 510 has an inwardly extending portion 520 rigid therewith which serves as a crank arm for rotating the wheel 510 about its spindle pivot. The crank arm 520 intermediate the spindle 513 and its free end has pivotal connection with the drag link 522 extending rearwardly through a suitable opening 523 in the transverse web between the frame members 300 at the forward end of the transmission 56, and is extended rearwardly above the driving axle to a pivotal connection 524 with the crank arm 498 carried by the lower end 495 of the steering shaft.

The rear wheels 19 of the truck are connected in the manner previously described through the crank 490 and drag link 493 with the arm 494 rigidly secured to the lower arm of the shaft 495. The wheels are interconnected by means of the drag link 489 extending between the free ends of the crank arms 486. Each of the pair of wheels 510 has rigid with the spindle brackets 513 thereof a rearwardly and inwardly extending crank arm 525, the outer ends of these crank arms having pivotal connection to the tie rod 526. Similarly, each of the wheels 512 has a forwardly and outwardly extending crank arm 527, the outer ends of these crank arms being connected together by the tie rod 528. In addition, the right hand wheel 512 has its spindle bracket 514 provided with a rigid extension 529 which extends through a suitable slot in the frame member to a point between the parallel frame members, and has pivotal connection, as indicated at 532, with a short tie rod or drag link 533 which, at its opposite end 534, is pivotally connected to the free end of the crank 520 carried by the spindle bracket 513 of the wheel 510. The frame member 300 is also slotted to receive the inwardly extending crank arm 520, and also to receive the tie rod 526 connecting the rear pair of wheels 510.

In the operation of the steering mechanism shown in Figure 4, rotation of the shaft 495 in a clockwise direction results in corresponding rotation of the arms 494 and 498. This results in turning of the wheels 19 in a clockwise direction through the crank arms 486 actuated by the crank arms 490 connected through link 493 with the arm 494.

The drag link 522, which extends longitudinally of the truck, is moved rearwardly resulting in a counterclockwise rotation of the crank arm 520. This results in a corresponding counterclockwise rotation of the interconnection arms 525 rotating the wheels 510 in a counterclockwise direction or in a direction opposite to the turning of the wheels 19. The crank 520, at its outer end, produces a rearward movement of the drag link 533 resulting in counterclockwise rotation of the crank 529 and corresponding simultaneous rotation of the wheels 512.

Due to the fact that the drag link 522 is connected substantially to the middle of the crank 520, while the drag link 533 is connected to the end thereof, a greater rate of movement in the drag link 533 is produced than is produced in the drag link 522. Thus, while the wheels 510 are rotated a predetermined distance about their spindle brackets 513, the wheels 512 are rotated through a greater angle due to this increased length of lever arm connected to the link 533. This produces a substantially greater turning effect since the leading wheels 512 rotate through a substantial arc and are followed by rotation of the wheels 510 through a lesser arc to cause turning of the front end of the vehicle to the left, the wheels 19 being rotated in an opposite direction to cause the rear end of the truck to follow around in a relatively short radius whereby the turning radius of the truck is materially reduced over that of a truck in which only the front wheels are dirigibly mounted.

It will be apparent that reverse rotation of the cranks 494 and 498 will produce corresponding reverse rotation of the wheels 19, 510 and 512, swinging the vehicle abruptly to the right for a right hand turn.

It will thus be apparent that the hand wheel 26 can rotate all of the wheels of the truck so as to produce a relatively short turning radius with a minimum effort on the part of the operator since the reduction produced in the housings reduces the force required to turn the shaft 495 so that the operator may, with facility, rotate the wheel and yet not be required to spin the wheel to an excessive extent in order to secure turning of the vehicle. The drag links 522, 526, 528 and 533 are all adjustable as to length so that proper alignment of the wheels can be obtained with respect to the wheels 19 and with respect to each other.

The mounting of the sets of wheels 510 and 512 on opposite ends of parallel arms 517 which are pivoted intermediate their ends, insures a substantial knee-action mounting of these wheels whereby no twisting stresses are imparted to the load-carrying platform 6 when the wheels are passing over an uneven floor or road surface, since the wheels are free to move vertically about the transverse shaft 519 as separate units on each side of the vehicle. This eliminates any possibility of shifting of the load or uneven wear of the tires on the wheels, and produces an efficient and positive support under the load-carrying platform.

Preferably, all of the wheels are provided with solid rubber tires of the industrial type to reduce noise and to provide some resiliency of support of the vehicle on the road surface. Since no braking effort is applied to the front wheels 500 or 510 and 512, the tires on these wheels may be made smooth, but preferably the tires 535 carried by the wheels 19 are provided with tread portions to increase their tractive effort and to prevent skidding.

From the foregoing description, it will be apparent that a number of important features have been incorporated in the present mechanism, among which is the provision of the front wheel mounting arrangement preventing the transmission of twisting stresses to the frame of the vehicle, and thereby prevents any possibilty of shifting the load on the platform. This, in connection with an improved type of steering control which reduces the turning radius of the vehicle to a considerable extent, greatly facilitates the use of the truck in carrying and picking up loads from narrow aisles and passageways.

In addition, it will be at once apparent that all of the wheels are readily accessible for inspection, lubrication and maintenance, and also that the steering control is simple in design, using substantially standardized parts that can be readily adjusted or replaced.

It is apparent that these, as well as other improved features of design and construction, can be modified both in the arrangement of the constituent parts thereof and in their relation to the other portions of the operating mechanism of the vehicle without departing from the basic underlying concepts of the invention, and I therefore do not intend to be limited to the exact details shown and described, but only insofar as defined by the scope and spirit of the appended claims.

I claim:

1. In a lift truck having a frame including a pair of forwardly extending parallel beam members provided with transverse rock shafts journalled therein adapted to have arms supporting a platform, the combination of a transverse axle shaft journalled in said beam members intermediate said rock shafts, parallel longitudinal arms on the outer sides of said beam members pivoted intermediate their ends on said axle shaft, wheels dirigibly mounted on the ends of each of said longitudinal arms, said platform extending over said wheels whereby said wheels are adapted to rock said longitudinal arms about said axle shaft when passing over uneven floor surfaces without interference with said platform, said beam members having transverse openings therethrough, tie rods extending through said openings and interconnecting each of the fore and aft pairs of wheels for conjoint movement, separate crank arms of unequal length connected to the fore and aft wheel on one of said longitudinal arms, a rod connected between the ends of said crank arms and a steering rod connected to the longer of said crank arms intermediate the ends thereof.

2. The combination of claim 1 further characterized by longitudinally extending connecting members disposed within said beam members and above said rock shafts for conjointly rotating said rock shafts to raise and lower said platform, and said steering rod is disposed below said connecting members and above said transverse shafts for transmitting steering action to said wheels upon longitudinal movement of said steering rod.

3. In an industrial truck having a pair of parallel longitudinal frame members, a transverse shaft journalled in said members, longitudinally extending rocker beams journalled intermediate their ends on said shaft on the outer sides of said frame members, steering wheels dirigibly mounted on the opposite ends of each beam, steering knuckles carried by each wheel, tie rods interconnecting the knuckles of the wheels at corresponding ends of said beam, a crank arm carried by one of said knuckles, a steering rod connected to said arm intermediate its ends, a second crank arm carried by a second knuckle on the same beam, and a tie rod connected between said second arm and the outer end of said first crank arm.

4. In an industrial truck, a load supporting and steering wheel assembly comprising a transverse shaft journalled in the truck, rocker beams pivoted intermediate their ends on the ends of said shaft, steering knuckles at opposite ends of said beams extending in opposite directions, the knuckles on one of said beams having crank arms extending toward the other beam, parallel transverse tie rods interconnecting the knuckles at corresponding ends of said beams and disposed beyond the ends of said beams, a steering rod connected to one of said crank arms intermediate its ends, and a rod connected between the outer end of said one crank arm and the other crank arm whereby longitudinal movement of said rod provides differential movement of said crank arms.

5. In combination, in a platform type lift truck including substantially parallel frame members having vertical web portions, a transverse shaft journalled adjacent opposite ends in said web portions, rocker arms pivotally mounted intermediate their ends on the ends of said shaft on the outer sides of said frame members, a wheel dirigibly mounted at each end of each rocker arm, transverse openings in said frame members, tie rods extending through certain of said openings interconnecting corresponding wheels of each rocker arm, crank arms extending through other of said openings into the space between said frame members, and steering connections to said crank arms extending within said frame members.

ELMER J. DUNHAM.